April 16, 1963 K. W. TANTLINGER ETAL 3,085,816
LONGITUDINALLY ADJUSTABLE TRAILER SUSPENSION
Filed June 27, 1960 6 Sheets-Sheet 1
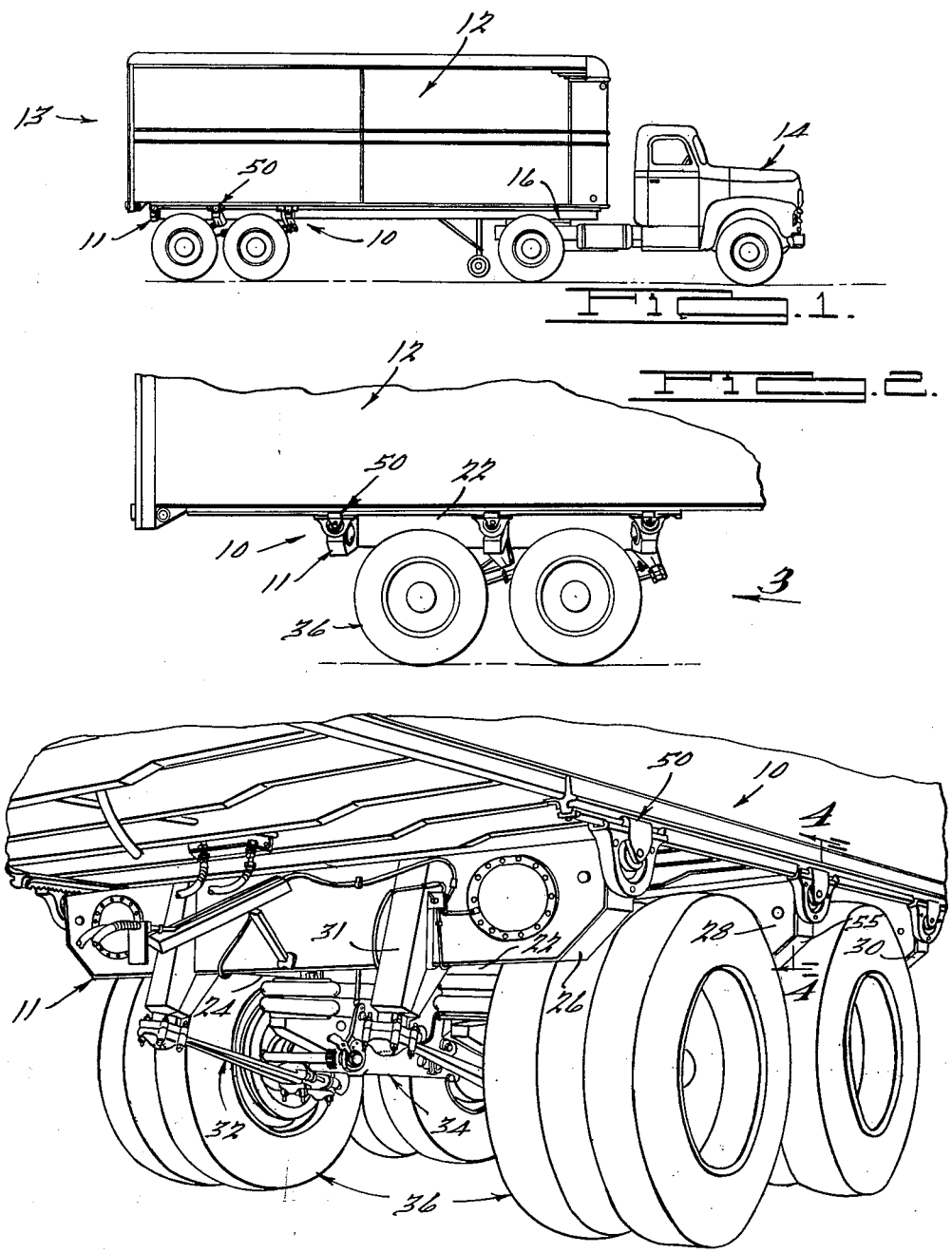
INVENTORS.
Keith W. Tantlinger.
Hans Locker
BY
Harness, Dickey & Pierce.
ATTORNEYS.

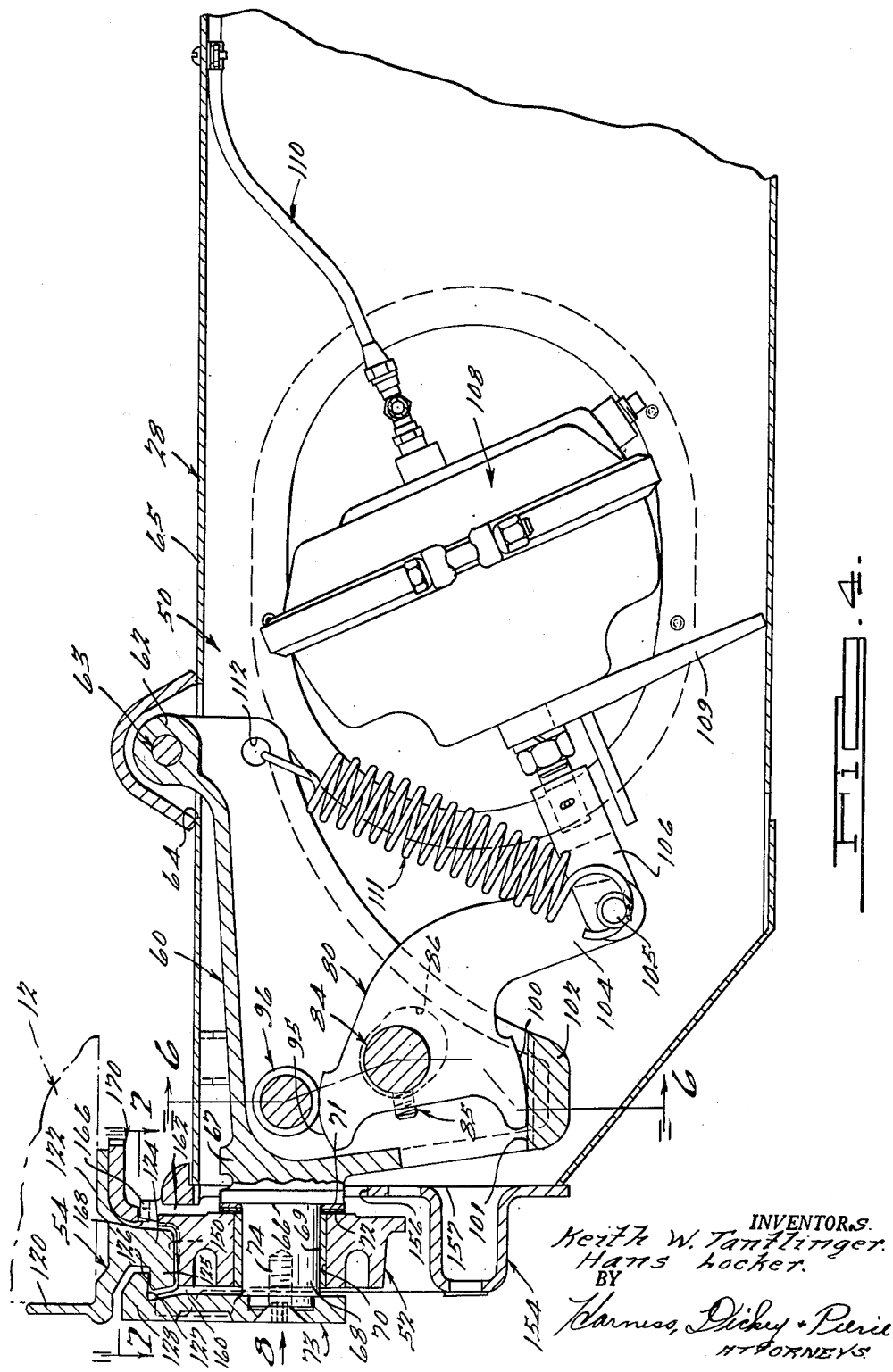

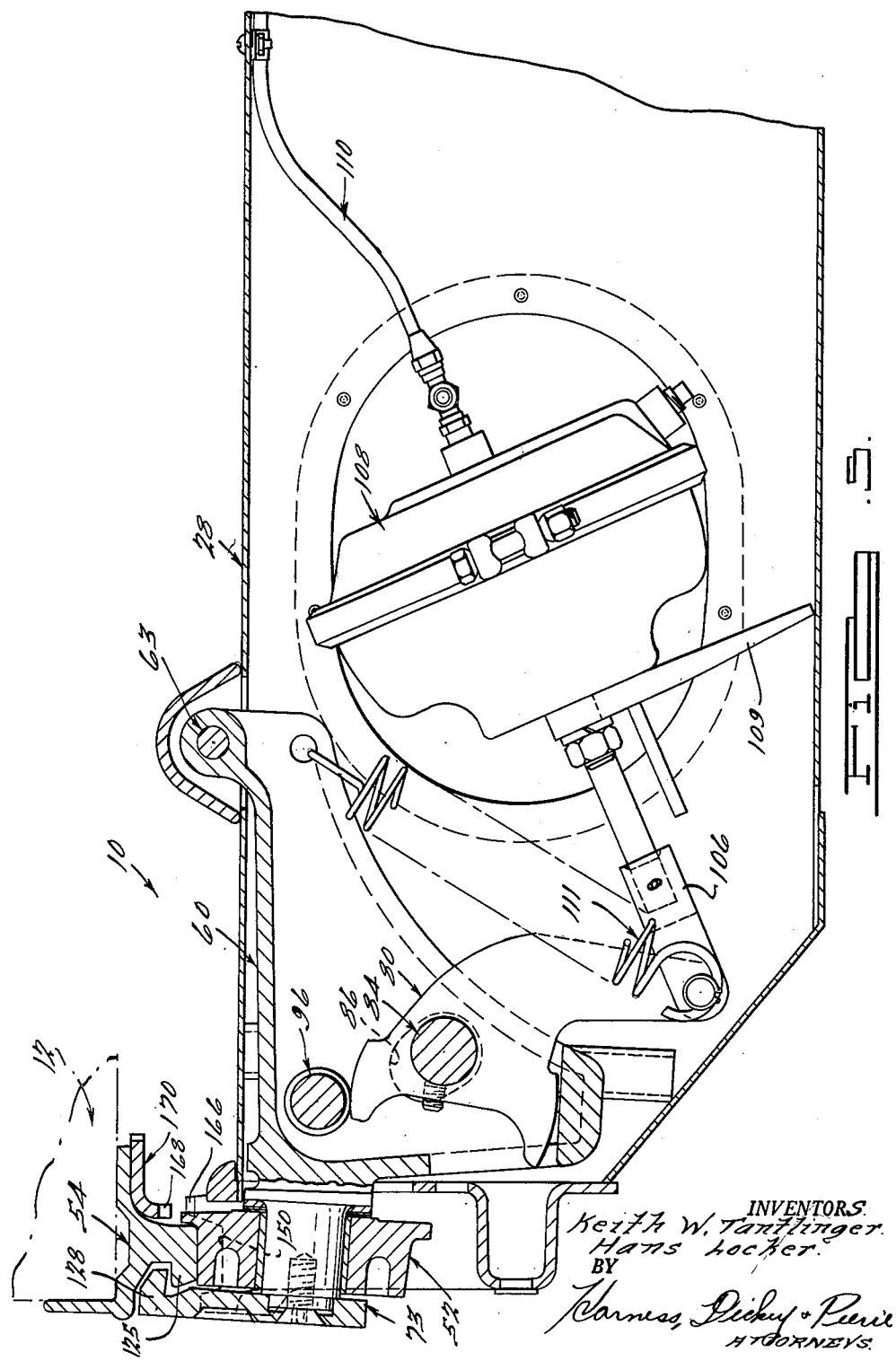

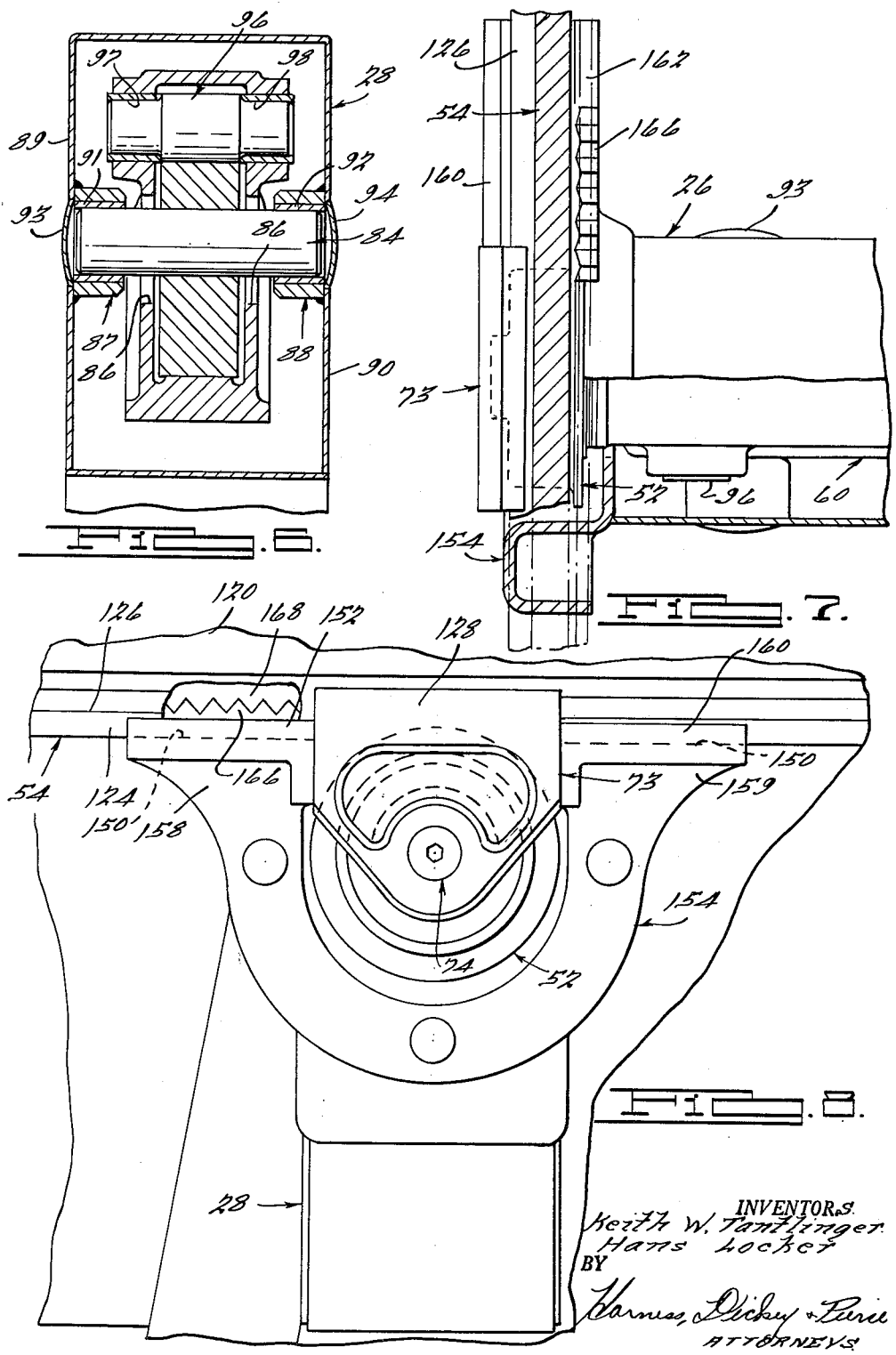

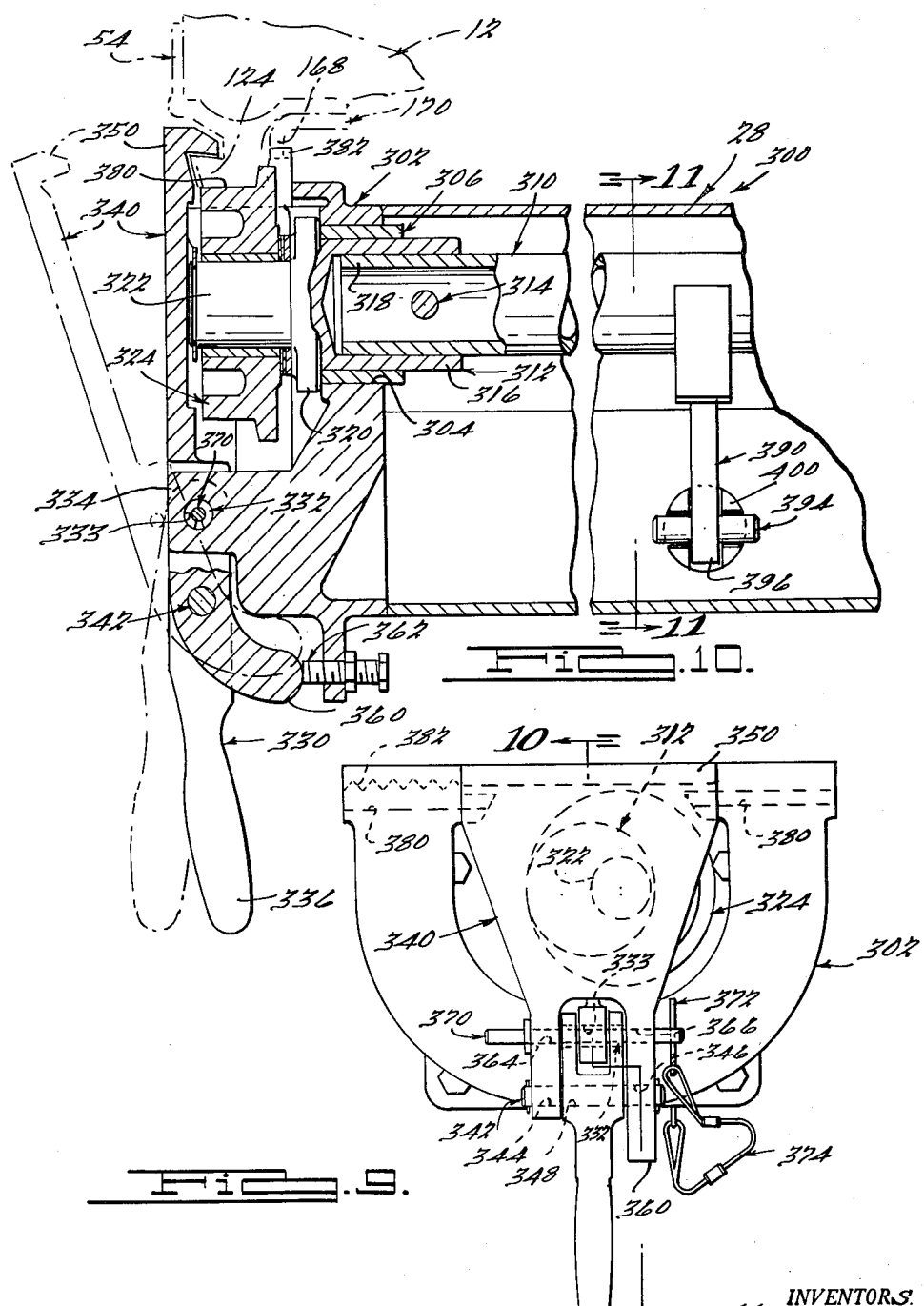

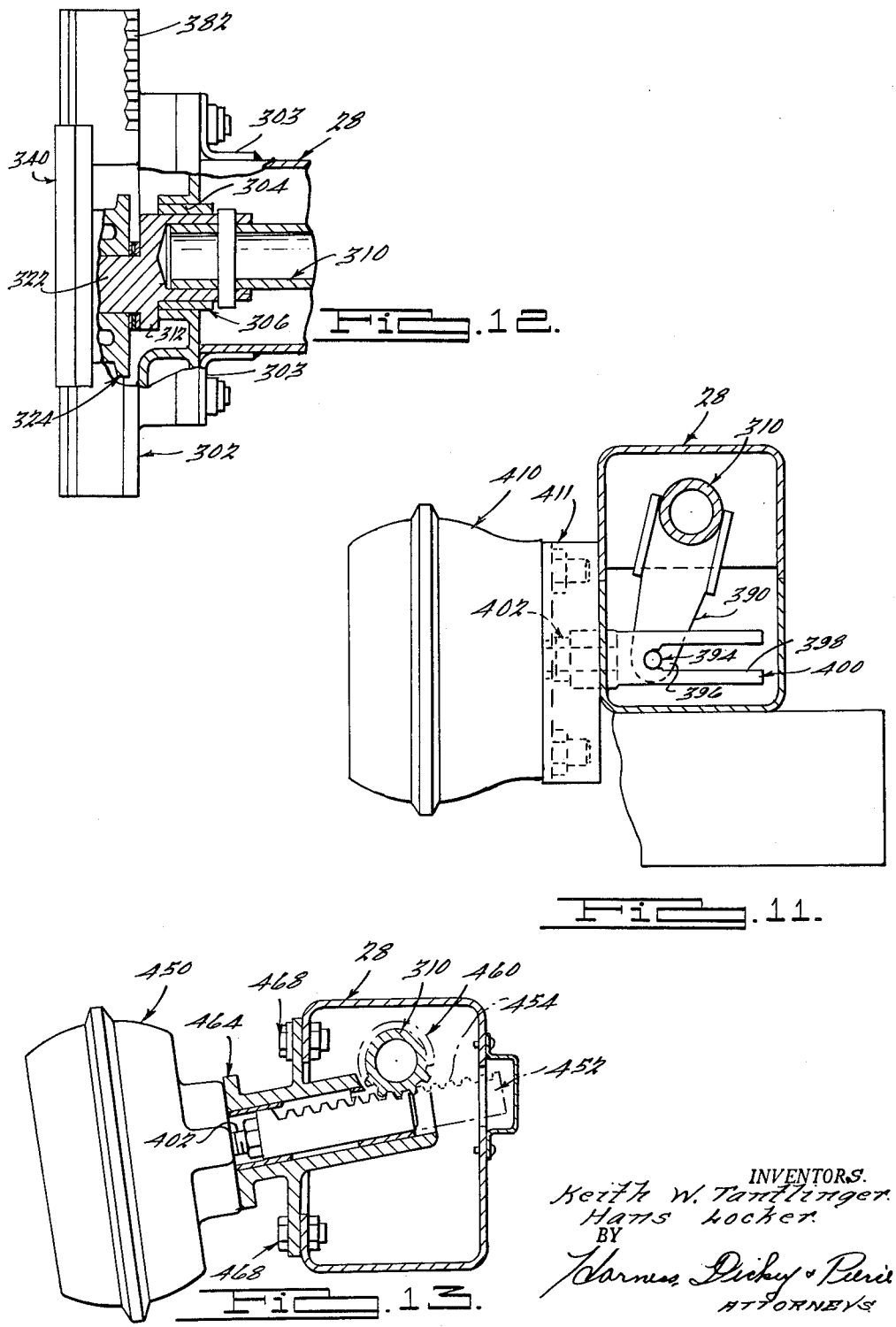

United States Patent Office 3,085,816
Patented Apr. 16, 1963

3,085,816
LONGITUDINALLY ADJUSTABLE TRAILER SUSPENSION
Keith W. Tantlinger, Grosse Pointe Shores, and Hans Locker, Utica, Mich., assignors to Fruehauf Trailer Company, Detroit, Mich., a corporation of Michigan
Filed June 27, 1960, Ser. No. 38,826
17 Claims. (Cl. 280—80)

This invention relates generally to wheeled trailers and more particularly to a suspension system for adjustably coupling the wheel bogie of a trailer to the body thereof.

It is often desirable to adjust the wheel bogie of a trailer longitudinally of the trailer body so that the total weight of the trailer can be suitably apportioned between the bogie wheels and the tractor wheels in accordance with state or local regulations. A proportionally greater load is transferred to the trailer wheels as the wheel bogie is moved forwardly under the trailer body and, conversely, a proportionally greater load is transferred to the tractor wheels as the wheel bogie is moved rearwardly of the trailer body.

It has been the practice, in adjustable trailer wheel suspensions heretofore known and used, to slidably support the trailer body for movement relative to the wheel bogie on a longitudinally extending frame that surmounts the wheel bogie. Generally, the longitudinal frame members of the trailer body are provided with depending vertical flanges that extend alongside the bogie frame to guide the relatively moving components during adjustment and to facilitate locking of the wheel bogie to the trailer body as by suitable bolts that extend laterally through the downwardly extending flanges and into the bogie frame.

The aforementioned prior art constructions have proved to be unsatisfactory in that rust, ice, dirt and the like tend to impede adjustment of the wheel bogie with respect to the trailer body. Because it is the practice to first set the brakes on the wheel bogie and then shift the trailer body with respect to the wheel bogie by using the tractor to move the trailer body forwardly or rearwardly of the wheel bogie, any impedance to relative movement between the trailer body and the wheel bogie may have a deleterious effect on the tractor clutch or transmission, particularly if the trailer is heavily loaded.

The present invention is directed to a novel adjustable suspension system comprising a lift mechanism mounted on the wheel bogie and operable to concurrently disengage a locking means between the wheel bogie and trailer body and to engage a plurality of anti-friction rollers with a complementary track on the trailer body to facilitate relative movement therebetween. When the rollers are disengaged from the track, the lock is automatically engaged to preclude relative longitudinal movement between the wheel bogie and trailer body. The wheel bogie is locatable at relatively small increments with respect to the trailer body.

Accordingly, one object of the present invention is to provide a novel suspension system for a trailer whereby the load supporting wheels of the trailer are adjustable longitudinally of the trailer body.

Another object is to provide a trailer construction wherein the wheel bogie is movable relative to the trailer body on anti-friction wheels.

Another object is a trailer construction wherein the trailer body is positively lockable to the wheel bogie to restrict relative movement therebetween.

Another object is to provide a trailer wherein the anti-friction wheels that support the trailer for movement relative to the wheel bogie are movable to an engaged and disengaged position.

Another object is to provide a trailer wherein the positioning means between the wheel bogie and trailer body is disengaged concurrently with engagement of anti-friction rollers that facilitate relative movement therebetween.

Another object is to provide a trailer wherein the trailer body is lockable with respect to the wheel bogie at relatively small longitudinal increments.

Other objects and advantages of the present invention will become apparent from a study of the following description and drawings, wherein:

FIGURE 1 is a side elevation of a tractor, trailer body and wheel bogie in operative association;

FIG. 2 is a fragmentary side elevation of the wheel bogie of the trailer of FIGURE 1, enlarged for clarity;

FIG. 3 is a fragmentary perspective view of the wheel bogie taken in the direction of the arrow "3" of FIG. 2;

FIG. 4 is a fragmentary cross-sectional view taken substantially along the line 4—4 of FIG. 3;

FIG. 5 is a cross-sectional view similar to FIG. 4, showing the lift mechanism in the elevated condition;

FIG. 6 is a cross-sectional view taken substantially along the line 6—6 of FIG. 4;

FIG. 7 is a cross-sectional view taken substantially along the line 6—6 of FIG. 4;

FIG. 8 is a fragmentary side elevation of the lift mechanism of FIG. 4 taken in the direction of the arrow "8";

FIG. 9 is an end view of a modified lift mechanism;

FIG. 10 is a fragmentary cross-sectional view taken substantially along the line 10—10 of FIG. 9;

FIG. 11 is a fragmentary cross-sectional view taken substantially along the line 11—11 of FIG. 10;

FIG. 12 is a fragmentary top view of the lift mechanism of FIG. 9; and

FIG. 13 is a fragmentary cross-sectional view similar to FIG. 11 of a modified hydraulic actuator for a lift mechanism.

An adjustable suspension system 10, in accordance with an exemplary embodiment of the present invention, is shown in operative association with a wheel bogie 11 and trailer body 12 of a trailer 13. The suspension system 10 has particular utility in adjustably coupling the wheel bogie 11 to the trailer body 12, the trailer 13 being connected to a tractor 14, in the conventional manner, as by a fifth wheel 16..

The wheel bogie 11 has a pair of longitudinally extending frame members 22 and 24 interconnected by a plurality of transversely extending bolsters 26, 28 and 30. A plurality of conventional spring support brackets 31 extend downwardly from the bolsters 26, 28 and 30 at appropriate locations thereon for the support of conventional torque rods 32 which are operatively connected to axles 34, and road contacting wheels 36. The wheel bogie 11, including the aforementioned components, is a self-sustaining unit and, as such, is disengageable from the trailer body 12, in a manner to be described.

In accordance with the present invention, the adjustable suspension system 10 comprises a plurality of lift mechanisms 50 that are supported within the bolsters 26, 28 and 30, one lift mechanism 50 being disposed at each outboard end of the bolsters 26, 28 and 30, respectively. The lift mechanisms 50 function to elevate a like plurality of anti-friction rollers 52 into engagement with a complementary rail 54 that is affixed to and extends longitudinally of the trailer body 12, in a manner to be described. Because the lift mechanisms 50 are similar in construction, only one will be described hereinafter, namely, the lift mechanism 50 associated with an outer end 55 of the bolster 28.

Each lift mechanism 50 comprises an arm 60, for example, a steel casting, of generally U-shaped vertical cross-section, that is pivotally supported at an inner end 62 by a pin 63 that is secured to the bolster 28, as by welding. The inner end portion 62 of the arm 60 extends upwardly through an aperture 64 in a top plate 65 of the bolster 28. The arm 60 has a generally vertically extending end face 66 at an outer end 67 thereof from which a generally horizontal roller journal 68 extends for the support of the roller 52.

The roller 52 has a suitable sleeve bearing 69 disposed in a bore 70 thereof to reduce friction between the roller 52 and the journal 68. A thrust-bearing 71 and a plurality of shim washers 72 are interposed between the roller 52 and the end face 66 of the arm 60 to position and reduce friction of the wheel 52 with respect to the arm 60. The wheel 52 is retained on the journal 68 by an end plate 73 that is secured to the journal 68 by a machine screw 74.

The arm 60 is rotatively biased about the pivot pin 63 by a cam lever 80. The cam lever 80 is supported for rotation by a shaft 84, and is fixedly secured thereto as by a set screw 85. The shaft 84 extends through an elongated arcuate slot 86 in the arm 60 and is journaled in suitable axially spaced bearings 87 and 88 that are secured to opposite side walls 89 and 90 of the bolster 28. The bearings 87 and 88 are provided with suitable bearing inserts 91 and 92 to facilitate rotation of the shaft 84 with respect to the bolster 28. Suitable caps 93 and 94 close the side walls 89 and 90 of the bolster 28 against the infiltration of foreign materials.

The cam lever 80 has an upper cam face 95 thereon that is engageable with a roller 96 that is supported in a pair of axially spaced bearings 97 and 98 in the arm 60. The cam face 95 has a contour that is so orientated with respect to the cam shaft 84 that, upon clockwise rotation of the cam lever 80, the cam face 95 biases the roller 96, and therefore the arm 60 and wheel 52, upwardly, as seen in the drawings.

A lower cam face 100 on the cam lever 80 is engageable with a lower cam surface 101 on a lower end 102 of the arm 60. The contour and orientation of the cam face 100 is such that it permits free movement of the arm 60 upwardly under the bias of the cam face 95 upon clockwise rotation of the cam lever 80, yet is engageable with the cam surface 101 to bias the arm 60 downwardly upon counterclockwise rotation of the cam lever 80. From the foregoing description, it should be apparent that the rotational position of the arm 60 is under positive control of the cam lever 80 at all times and therefore is locked in a lower position when the cam lever 80 is biased counterclockwise, as is the normal condition, to be described.

The cam lever 80 has a downwardly extending arm 104 having a transverse pin 105 therein to facilitate connection of the cam lever 80 to a piston 106 of a pneumatic actuator 108. The actuator 108 is of conventional construction and is secured to the bolster 28 as by a support 109. A suitable conduit 110 connects the actuator 108 to a source of fluid pressure.

A helical coil spring 111 extends between the pin 105 and an aperture 112 in the upper end portion 62 of the arm 60 to normally bias the cam lever 80 counterclockwise with respect to its pivotal support 84 and to retract the piston 106 into the actuator 108.

The rail 54 has a vertical flange 120 and a horizontal flange 122, adapted to be attached to the lower outboard edge of the trailer body 12, by any suitable means. The rail 54 has a downwardly depending rib portion 124 with a horizontally extending flange or gooseneck 125 thereon, an upper face 126 of which is engageable with a complementary lower face 127 on a horizontally extending flange or gooseneck 128 on the roller retainer plate 73. The aforementioned engagement of the flanges 125 and 128 biases the trailer body 12 downwardly with respect to the bolster 28 upon downward movement of the arm 60, as will be described.

As best seen in FIGS. 4, 7 and 8, the rail 54 is normally seated in a complementary way 150 in an upper end portion 152 of a bolster end bracket 154. The end bracket 154 has a central aperture 156 for the acceptance of the roller 52 and is rigidly affixed to an outer end 157 of the bolster 26, as by welding. The bracket 154 has a pair of generally radial extensions 158 and 159 with a pair of spaced upwardly extending flanges 160 and 162 thereon that define the way 150. The innermost flange 162 has a plurality of longitudinally spaced teeth or serrations 166 thereon that are engageable with complementary downwardly extending serrations 168 on an index plate 170 that is secured to the rail 54, as by welding.

In order to longitudinally adjust the wheel bogie 11 with respect to the trailer body 12 the driver first energizes the air brakes on the wheels 36 of the wheel bogie 11. The pneumatic actuator 108 is then energized to pivot the cam lever 80 in a clockwise direction to engage the cam face 95 thereof with the roller 96. As the cam lever 80 rotates clockwise, the roller 96 rides up on the cam face 95, biasing the arm 60 clockwise about its pivot 63. As best seen in FIG. 5, the first increment of clockwise rotation of the arm 60 disengages the gooseneck 128 on the plate 73 from the gooseneck 125 on the rail 54 and effects engagement of the roller 52 with the downwardly depending rib 124. As the arm 60 continues to rotate clockwise, the wheel 52 lifts the rail 54 and trailer body 12 sufficiently to disengage the interlocking teeth 166 and 168. The operator then shifts the trailer body 12 with respect to the wheel bogie 11, as by driving the trailer forwardly or rearwardly. The wheel bogie 11 remains stationary because the brakes on the wheels 36 are set, the body 12 therefore moving freely relative to the wheel bogie 11 on the rollers 52. As the arm 60 raises the trailer body 12 any rust or dirt that otherwise might tend to hold the trailer body 12 on the wheel bogie 11 is broken away.

After the longitudinal adjustment has been made, the actuator 108 is deenergized whereupon the weight of the trailer 12 biases the arm 60 counterclockwise and the spring 111 biases the cam lever 80 counterclockwise. As the arm 60 rotates counterclockwise, the rail 54 settles into the way 150 and the teeth 166 and 168 re-engage.

It is to be noted that during the final increment of rotation of the cam lever 80, the lower cam face 100 thereof engages the cam surface 101 on the arm 60 to bias the arm downwardly and bring the locking goosenecks 125 and 126 into clamping engagement, whereupon the trailer body 12 is securely locked to the wheel bogie.

Referring to FIGS. 9 through 12, a plurality of modified lift mechanisms 300 are adapted to be mounted internally of the cross bolsters 26, 28 and 30, one such lift mechanism 300 being provided at the outboard end of each bolster 26, 28 and 30, respectively. For the purpose of clarity, the lift mechanism 300 is shown operatively associated with the bolster 28, referred to hereinbefore.

Each lift mechanism 300 comprises an end casting 302 that is bolted to complementary flanges 303 on the end of the bolster 28. The casting 302 has an aperture 304 therein for the acceptance of a suitable bearing 306, for example a bronze sleeve bearing. A rotatable operating shaft 310 having an eccentric 312 coupled thereto as by a pin 314, extends longitudinally of the bolster 28 for the operation of the lift mechanism 300, as will be described. The eccentric 312 has a tubular inner end portion 316 for the acceptance of an end portion 318 of the shaft 310. The eccentric 312 has a radial flange 320 and a wheel journal 322 that position and support a wheel 324, respectively. The wheel 324 is engageable with the rail 54 on the trailer body 12, as will be described. As best seen in FIG. 12, the central axis of the wheel journal 322 is radially displaced from the central axis of the tubular portion 316 and shaft 310.

A forked toggle handle 330 is pivotally supported on a hollow pin 332 that extends through an aperture 333 in an outwardly projecting flange 334 on the end casting 302. A lower end portion 336 of the toggle handle 330 is formed so as to provide a handle to facilitate movement thereof. A clamp 340 is pivotally supported for rotation with respect to the toggle handle 330 by a pin 342 that extends through suitable apertures 344 and 346 in the clamp 340 and an aperture 348 in the toggle handle 330. Movement of the toggle handle 330 about its hollow pivot pin 332 moves the clamp member 340 upwardly and downwardly with respect to the end casting 302 thereby to disengage and engage, respectively, a flanged upper end portion 350 of the clamp 340 with the complementary flange or gooseneck 124 on the rail 54 of the trailer body 12. A lower end portion 360 of the clamp 340 is engageable with an adjustable stop 362 to define an over-center position for the pin 342 with respect to a line drawn between the central axis of the hollow pin 332 and the point of engagement between the complementary flanges 350 and 124 on the clamp 340 and rail 54, respectively. The clamp 340 has a pair of bores 364 and 366 extending therethrough for the acceptance of a lock pin 370. The lock pin 370 is insertable through the bores 364 and 366 and through the center of the hollow pivot pin 332 thereby to lock the clamp 340 in the over-center position with respect to the toggle handle 330 and end casting 302. The locking pin 370 is secured in the assembled position as by a pin 372 that is secured against loss as by a laniard 374.

It is to be noted that the end casting 302 has a seating surface 380 for the downwardly depending flange 124 on the side rail 54 of the trailer body 12 and a plurality of upwardly extending teeth 382 for engagement with the downwardly depending teeth 168 on the index flange 170 of the side rail 54. In this manner, the side rail 54 of the trailer body 12 is positionable at relatively small increments longitudinally of the wheel bogie 11.

As best seen in FIG. 11, rotation of the operating shaft 310 is effected by a crank 390 that is secured thereto by any suitable means, for example, welding. The crank 390 has a transverse pin 394 at a lower end 396 thereof that is engageable in a complementary slot 398 of a yoke 400 on the end of an actuator shaft 402 of a pneumatic actuator 410. The actuator 410 is supported with respect to the transverse bolster 28 as by a bracket 411.

Referring to FIG. 12, a modified coupling between a pneumatic actuator 450 and the drive shaft 310 comprises a gear rack 452 having a plurality of teeth 454 thereon that is secured to the output shaft 402 of the actuator 450 as by a threaded connection. The gear rack 452 cooperates with a complementary spur gear 460 on the shaft 310 to effect rotation of the shaft 310 upon energization of the actuator 450. The actuator 450 is supported with respect to the bolster 28 as by a bracket 464 that is secured to the bolster 28 as by machine screws 468.

Elevation of the trailer body 12 with respect to the wheel bogie 11 is effected by actuation of the pneumatic actuator 410 or 450 after first moving the toggle handle 330 upwardly to disengage the clamp 340 from the rail 54.

Energization of the actuator 410 or 450 effects rotation of the operating shaft 310, which, because of the eccentric disposition of the journal 322 on the ends thereof, effects elevation of the wheels 324, rail 54 and trailer body 12. After the trailer body 12 is positioned longitudinally of the wheel bogie 11, the actuator 410 or 450 is deenergized, allowing the shaft 310 to rotate downwardly under the weight of the trailer body 12 to the position shown in FIG. 10 wherein the lower end flange 124 on the rail 54 is seated on the way 380 of the end casting 302 and the teeth 168 of the locking flange 170 of the rail 54 are engaged in the complementary teeth 382 on the end casting 302. The gooseneck 350 of the clamp 340 is then re-engaged with the flange 124 of the rail 54 and the handle 330 is moved downwardly, or counterclockwise, as seen in the drawing, about its pivotal support 332, until the pin 342 extending therethrough passes over-center to a position defined by engagement of the end portion 360 of the clamp 340 with the adjustment screw 362. The toggle handle 330 and clamp 340 are locked in the downward position by insertion of the pin 370 through the aligned holes 364 and 366 in the clamp 340 and through the center of the pivotal support 332 for the toggle handle 330.

It is to be understood that the specific construction of the improved suspension system herein disclosed and described, is presented for the purpose of explanation and illustration and is not intended to indicate limits of the invention, the scope of which is defined by the following claims.

What is claimed is:

1. An adjustable suspension system for a trailer including a wheel bogie and a trailer body, said suspension system comprising means for normally restricting relative longitudinal movement between the wheel bogie and the trailer body, anti-friction means to facilitate relative longitudinal movement between the wheel bogie and the trailer body, and means mechanically connecting said restricting means and said anti-friction means operable in one direction to concurrently disengage said restricting means and interpose the anti-friction means between the wheel bogie and the trailer body to facilitate relative movement therebetween and in another direction to concurrently disengage said anti-friction means and engage said restricting means.

2. An adjustable suspension system for a trailer including a wheel bogie and a trailer body, said system comprising longitudinally extending rail means underlying the trailer body, seating means on the wheel bogie for normally accepting said rail means, mutually complementary index means on said rail and seating means, respectively, for positioning the wheel bogie longitudinally of the trailer body and for restricting relative longitudinal movement therebetween, anti-friction means on the wheel bogie engageable with the rail means on the trailer body operable to elevate the trailer body with respect to the wheel bogie, and means connecting the index means on the wheel bogie with the anti-friction means thereon operative to concurrently disengage said index means and engage the anti-friction means with said rail means thereby to facilitate relative longitudinal movement between the wheel bogie and trailer body.

3. An adjustable suspension system for a trailer including a wheel bogie and a trailer body, said system comprising a longitudinally extending rail on the lower side of the trailer body, seating means on the wheel bogie for normally accepting said rail, complementary index means on said rail and seat, respectively, for positioning the wheel bogie longitudinally of the trailer body and for restricting relative longitudinal movement therebetween, means engageable with said rail for locking the trailer body against vertical movement with respect to the wheel bogie, and power-operated means including anti-friction means operable to unlock said locking means, disengage said index means and engage the anti-friction means with the trailer body to condition the trailer body for relative movement longitudinally with respect to the wheel bogie.

4. An adjustable suspension system for a trailer including a wheel bogie and a trailer body, said system comprising a longitudinally extending rail on the trailer body, seating means on the wheel bogie for normally accepting said rail, complementary index means on said rail and seat, respectively, for positioning the wheel bogie longitudinally of the trailer body and for restricting relative longitudinal movement therebetween, an arm having a rail engaging roller at one end thereof and pivotable so as to elevate the roller into engagement with said rail, and power-operated means for pivoting said arm thereby to engage the roller with the rail and disengage said index means to condition the trailer body for relative movement longitudinally with respect to the wheel bogie.

5. An adjustable suspension system for a trailer including a wheel bogie and a trailer body, said system comprising a longitudinally extending rail on the trailer body, seating means on the wheel bogie for normally accepting said rail, complementary index means on said rail and seat, respectively, engageable to position the wheel bogie longitudinally of the trailer body and to restrict relative longitudinal movement therebetween, an arm having a rail engaging roller at one end thereof, a cam engageable with the arm to bias the roller thereof upwardly, and power-operated means operable to actuate said cam to elevate said arm and roller thereby to disengage said index means and engage the roller with said rail to condition the trailer body for relative movement longitudinally of the wheel bogie.

6. An adjustable suspension system for a trailer including a wheel bogie and a trailer body, said system comprising a longitudinally extending rail on the trailer body, seating means on the wheel bogie for normally accepting said rail, complementary index means on said rail and seat, respectively, engageable to position the wheel bogie longitudinally of the trailer body and to restrict relative longitudinal movement therebetween, an arm having a roller on one end engageable with said rail on the trailer body and pivoted at the other end for rotation about a horizontal axis, a rotatable cam engageable with said arm upon rotation in one direction to bias said arm and roller upwardly with respect to the wheel bogie to engage the roller with said rail and to disengage said index means to condition the trailer body for relative movement longitudinally of the wheel bogie, said cam being engageable upon rotation in the other direction to lock said arm downwardly thereby to disengage the roller from the rail and engage said index means to restrict relative movement of the trailer with respect to the wheel bogie.

7. An adjustable suspension system for a trailer including a wheel bogie and a trailer body, said system comprising a longitudinally extending rail on the trailer body, seating ways on the wheel bogie for normally accepting said rail, complementary index means on said trailer body and wheel bogie, respectively, for positioning the wheel bogie longitudinally of the trailer body and for restricting relative longitudinal movement therebetween, means including a roller engageable with said rail on the trailer body, a cam engageable with said roller to bias said roller upwardly with respect to the wheel bogie to disengage said index means and engage the roller with said rail on the trailer body to condition the trailer body for relative movement longitudinally of the wheel bogie, said cam being operable to lock said index means in the engaged condition to restrict relative movement of the trailer with respect to the wheel bogie.

8. An adjustable suspension system for a trailer including a wheel bogie and a trailer body, said system comprising a pair of longitudinally extending rails on the trailer body, a pair of seating ways on the wheel bogie for normally accepting said rails, complementary index teeth on said rails and ways, respectively, engageable when said rails are seated on said ways to position the wheel bogie longitudinally of the trailer body and to restrict relative longitudinal movement therebetween, a pair of transversely extending arms having rollers on the outer ends thereof engageable with said rails on the trailer body, respectively, and pivoted at the inner ends for rotation about horizontally extending axes, and a pair of rotatable cam levers engageable with said arms, respectively, upon rotation in one direction to bias said arms and rollers upwardly with respect to the wheel bogie to engage the rollers with said rails and to disengage said index teeth to condition the trailer body for relative movement longitudinally of the wheel bogie, said cams being rotatable in the other direction to lock said arms downwardly thereby to disengage the rollers from the rails and engage said index teeth to restrict relative movement of the trailer with respect to the wheel bogie.

9. An adjustable suspension system for a trailer including a wheel bogie and a trailer body, said system comprising a pair of longitudinally extending rails on the trailer body having horizontal flanges thereon, seating ways on the wheel bogie for normally accepting said rails, a plurality of downwardly extending longitudinally spaced teeth on said rails, a plurality of upwardly extending longitudinally spaced teeth on said ways complementary to the teeth on said rails and engageable therewith to position the wheel bogie longitudinally of the trailer body and to restrict relative longitudinal movement therebetween, a plurality of rollers engageable with said rails, respectively, and means comprising a plurality of cams operable to bias said rollers upwardly with respect to the wheel bogie to disengage said teeth and engage said rollers with said rails on the trailer body to condition the trailer body for relative movement longitudinally of the wheel bogie, said cams being operable to engage said teeth to restrict relative movement of the trailer with respect to the wheel bogie.

10. An adjustable suspension system for a trailer including a wheel bogie and a trailer body, said system comprising a pair of longitudinally extending rails on the trailer body, seating ways on the wheel bogie for normally accepting said rails, complementary index means on said trailer body and wheel bogie, respectively, comprising a plurality of longitudinally spaced teeth engageable to position the wheel bogie longitudinally of the trailer body and to restrict relative longitudinal movement therebetween, means engageable with said rails on the trailer body, comprising a pair of rollers supported on oppositely extending arms, a pair of cams engageable with said arms to bias said arms upwardly with respect to the wheel bogie to disengage said index means and engage the rollers with said rails on the trailer body to condition the trailer body for relative movement longitudinally of the wheel bogie, said cams being operable to lock said index means in the engaged condition to restrict relative movement of the trailer with respect to the wheel bogie.

11. An adjustable suspension system for a trailer including a wheel bogie and a trailer body, said system comprising a pair of longitudinally extending rails on the trailer body, having downwardly extending ribs, respectively, with generally horizontal flanges on the lower end thereof, seating ways on the wheel bogie for normally accepting said rails, complementary index means on said trailer body and wheel bogie, respectively, comprising a plurality of longitudinally spaced teeth engageable to position the wheel bogie longitudinally of the trailer body in increments dictated by the spacing of the teeth and to restrict relative longitudinal movement therebetween, means for elevating said trailer body comprising a plurality of transversely extending arms each having a roller on the outboard end thereof, each of said arms being pivoted at its inner end and having a pair of vertically spaced cam surfaces thereon, a plurality of cam levers associated with said arms, respectively, each of said cam levers having a pair of cam faces one of which is engageable with one of the cam surfaces on said arms to effect elevation of the roller thereon into engagement with said rails to disengage said index means and condition the trailer body for relative movement longitudinally of the wheel bogie, the other of the cam faces on said cam being engageable with the lower one of said cam surfaces on said arms to lock said index means in the engaged condition to restrict relative movement of the trailer with respect to the wheel bogie.

12. An adjustable suspension system for a trailer including a wheel bogie and a trailer body, said system comprising a longitudinally extending rail on the trailer body, seating means on the wheel bogie for normally accepting said rail, complementary index means on said rail and seat, respectively, engageable to position the wheel bogie longitudinally of the trailer body and to restrict relative longitudinal movement therebetween, an operating shaft extending transversely of said wheel bogie having an eccentric at the end thereof, a roller journaled on the eccentric of said shaft, and power operated means for effecting rotation of said operating shaft thereby to elevate and engage said roller with said rail and to disengage said index means to condition the trailer body for relative movement longitudinally of the wheel bogie.

13. An adjustable suspension system for a trailer including a wheel bogie and a trailer body, said system comprising a longitudinally extending rail on the trailer body, seating means on the wheel bogie for normally accepting said rail, complementary index means on said rail and seat, respectively, engageable to position the wheel bogie longitudinally of the trailer body and to restrict relative longitudinal movement therebetween, a toggle handle pivotally supported by said wheel bogie, a rail clamp pivotally supported by said toggle handle and engageable with said rail upon rotation of said toggle handle in one direction to lock said rail against said seating means and lock said index means in the engaged condition, rotation of said toggle handle in the other direction effecting release of said rail clamp and unlocking said index means, an operating shaft extending transversely of said wheel bogie having an eccentric at the end thereof, a roller journaled on the eccentric of said shaft, and power operated means for effecting rotation of said operating shaft thereby to elevate and engage said roller with said rail and to disengage said index means to condition the trailer body for relative movement longitudinally of the wheel bogie.

14. An adjustable suspension system for a trailer including a wheel bogie and a trailer body, said system comprising a pair of longitudinally extending generally parallel rails on the trailer body, a pair of ways on the wheel bogie for normally accepting said rails, complementary index means on said rail and seat, respectively, comprising a plurality of longitudinally spaced teeth engageable to position the wheel bogie longitudinally of the trailer body and to restrict relative longitudinal movement therebetween, a pair of toggle handles pivotally supported on opposite sides of said wheel bogie, a pair of rail clamps pivotally supported by said toggle handles, respectively and engageable with said rails upon rotation of said toggle handles in one direction to lock said rails against said ways and said index teeth in the engaged condition, rotation of said toggle handles in the other direction effecting release of said rail clamps and unlocking said index teeth, an operating shaft extending transversely of said wheel bogie having an eccentric at each end thereof, a roller journaled on each of the eccentrics of said shaft, and power operated means for effecting rotation of said operating shaft thereby to elevate and engage said rollers with said rails and to disengage said index teeth to condition the trailer body for relative movement longitudinally of the wheel bogie.

15. An adjustable suspension system for a trailer including a wheel bogie and a trailer body, said system comprising a longitudinally extending rail on the trailer body, seating means on the wheel bogie for normally accepting said rail, complementary index means on said rail and seat, respectively, engageable to position the wheel bogie longitudinally of the trailer body and to restrict relative longitudinal movement therebetween, an operating shaft extending transversely of said wheel bogie having an eccentric journal at the end thereof, a roller mounted on the journal of said shaft, a pneumatic actuator having an output shaft extending transversely of said operating shaft and engageable with a crank thereon to effect rotation of said operating shaft thereby to elevate and engage said roller with said rail and to disengage said index means to condition the trailer body for relative movement longitudinally of the wheel bogie, and means for locking said rail in said seating means and said index means in engagement comprising a toggle handle pivoted on said wheel bogie, a clamp pivoted on said toggle handle and engageable with said rail on the trailer body, said toggle handle being movable to an over-center position with respect to its pivotal axis and the point of engagement between said clamp and said rail and a pin insertable through said toggle handle and clamp for securing said locking means in the over-center condition.

16. An adjustable suspension system for a trailer including a wheel bogie and a trailer body, said system comprising a longitudinally extending rail on the trailer body, seating means on the whel bogie for normally accepting said rail, complementary index means on said rail and seat, respectively, engageable to position the wheel bogie longitudinally of the trailer body and to restrict relative longitudinal movement therebetween, an operating shaft extending transversely of said wheel bogie having an eccentric at the end thereof, a roller journaled on the eccentric of said shaft, and a pneumatic actuator having an output shaft comprising a gear rack extending transversely of said operating shaft and engageable with a complementary gear thereon to effect rotation of said operating shaft thereby to elevate and engage said roller with said rail and to disengage said index means to condition the trailer body for relative movement longitudinally of the wheel bogie.

17. An adjustable suspension system for a trailer including a wheel bogie and a trailer body, said system comprising a longitudinally extending rail on the trailer body, seating means on the wheel bogie for normally accepting said rail, complementary index means on said rail and seat, respectively, engageable to position the wheel bogie longitudinally of the trailer body and to restrict relative longitudinal movement therebetween, an operating shaft extending transversely of said wheel bogie having an eccentric at the end thereof, a roller journaled on the eccentric of said shaft, and a pneumatic actuator having an output shaft extending transversely of said operating shaft and engageable with a crank thereon to effect rotation of said operating shaft thereby to elevate and engage said roller with said rail and to disengage said index means to condition the trailer body for relative movement longitudinally of the wheel bogie.

References Cited in the file of this patent

UNITED STATES PATENTS

| | | |
|---|---|---|
| 1,944,374 | Schmidtke | Jan. 23, 1934 |
| 2,589,678 | De Lay | Mar. 18, 1952 |